United States Patent [19]

Nelson

[11] 4,176,362
[45] Nov. 27, 1979

[54] HIGH DENSITY MAGNETIC IMAGE RECORDING HEAD

[75] Inventor: Alfred M. Nelson, Redondo Beach, Calif.

[73] Assignee: AM International, Inc., Los Angeles, Calif.

[21] Appl. No.: 758,018

[22] Filed: Jan. 10, 1977

Related U.S. Application Data

[63] Continuation-in-part of Ser. No. 594,583, Jul. 10, 1975, Pat. No. 4,025,927.

[51] Int. Cl.² .................... G03G 19/00; G06K 15/14; G01D 15/12
[52] U.S. Cl. ..................................... 346/74.1; 360/63
[58] Field of Search ................. 346/74.1, 154; 360/63, 360/122, 123

[56] References Cited

U.S. PATENT DOCUMENTS

| | | | |
|---|---|---|---|
| 2,820,956 | 1/1958 | Rueger | 346/74.1 |
| 3,249,923 | 5/1966 | Simshauser | 346/74.1 |
| 3,564,522 | 2/1971 | Stevens | 360/63 |
| 3,611,417 | 10/1971 | Sauter | 360/123 |
| 3,662,396 | 5/1972 | Brown, Jr. | 346/154 |
| 3,732,573 | 5/1973 | Merka | 346/154 |
| 3,787,964 | 1/1974 | Simon | 360/123 |
| 3,877,070 | 4/1975 | Takenouchi | 360/63 |
| 3,891,995 | 6/1975 | Hanazono | 360/123 |
| 3,908,194 | 9/1975 | Romankiw | 360/122 |
| 3,946,403 | 3/1976 | Ikeuchi et al. | 346/154 |
| 4,025,927 | 5/1977 | Nelson | 346/74.1 |
| 4,037,258 | 7/1977 | Chari | 360/63 |
| 4,058,814 | 11/1977 | Brown, Jr. | 346/154 |

FOREIGN PATENT DOCUMENTS

1440343  6/1976  United Kingdom ..................... 360/123

Primary Examiner—Jay P. Lucas
Attorney, Agent, or Firm—Robert S. Hulse

[57] ABSTRACT

A head for magnetizing a broad magnetic tape or the like to form magnetic images representing lines of high quality characters or other images, including a large number of closely-spaced recorder elements, such as two thousand spaced a few thousandths inches apart, the elements having parallel strip portions with recording locations therealong. The elements are arranged in groups, with the elements in one group having a common enlarged interconnected region on one side of the recording locations and with each element in the group having a separate enlarged terminal on the other side of the line of recording locations. The terminals are arranged in a staggered fashion, so that the elements located progressively closer to one end of the group have terminals located progressively further from the line of recording locations. The groups are arranged so that every other group has its common interconnect region on one side of an imaginary recording line while the groups in between have their common regions on the other side of the line. This arrangement provides large common areas and large terminals to which connections can be made, even though the strip portion of each element is very narrow.

10 Claims, 8 Drawing Figures

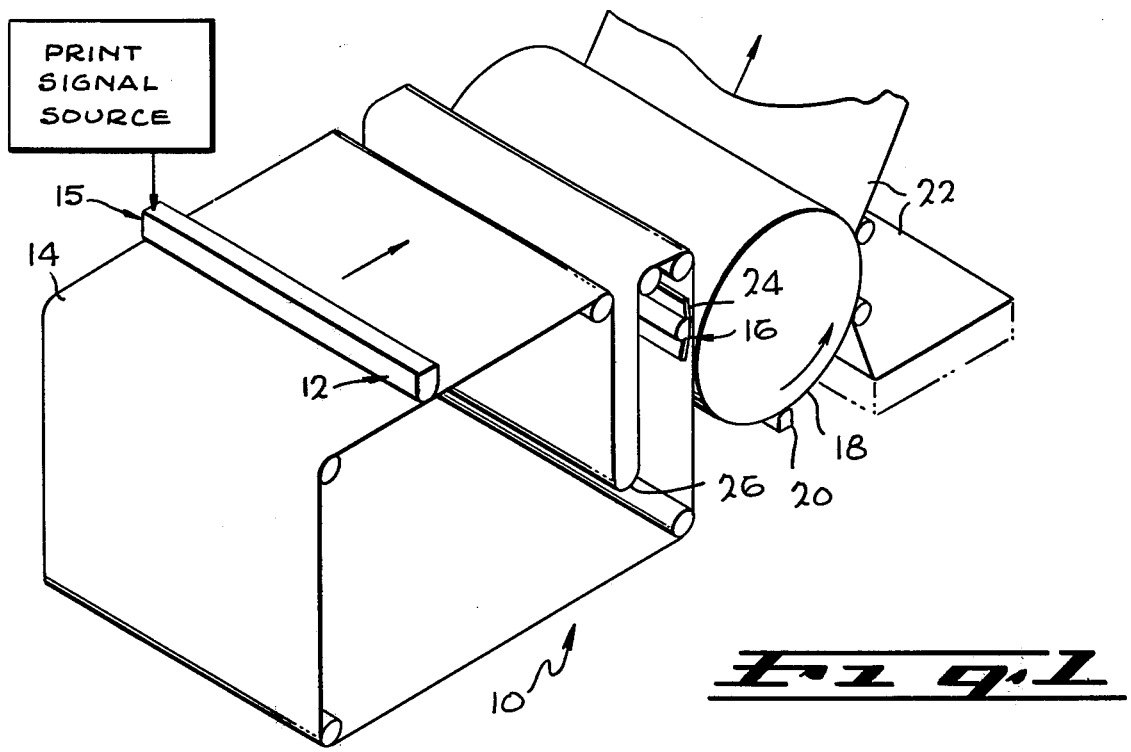
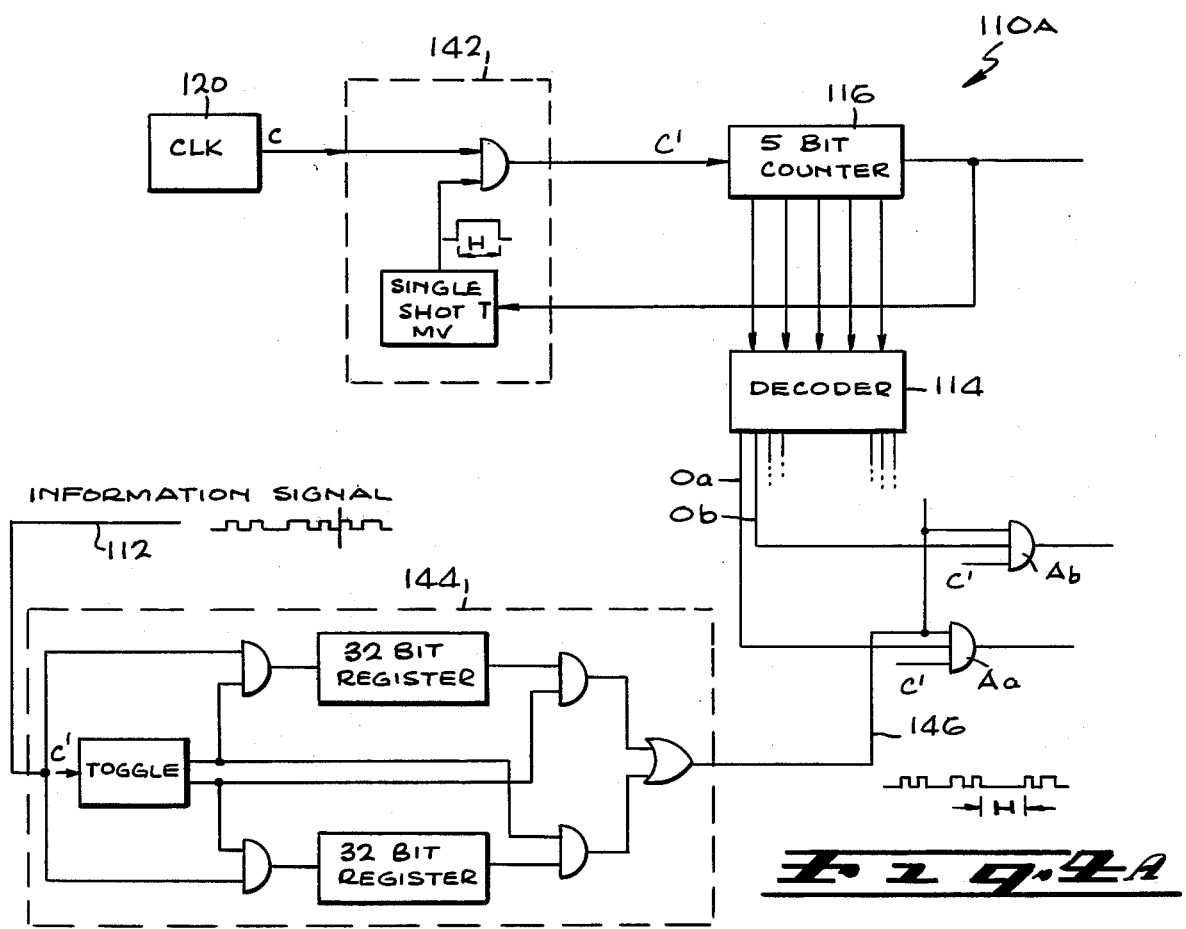

HIGH DENSITY MAGNETIC IMAGE RECORDING HEAD

REFERENCE TO RELATED APPLICATION

This is a continuation-in-part of U.S. application Ser. No. 594,583 filed July 10, 1975, now issued May 24, 1977 as U.S. Pat. No. 4,025,927.

BACKGROUND OF THE INVENTION

My earlier patent application Ser. No. 594,583 filed July 10, 1975, now U.S. Pat. No. 4,025,927, describes a magnetic recording head for recording images on a magentic tape, the head including a group of closely-spaced parallel conductors. Each conductor included a thin nickel layer nearest the magnetic tape and thick copper layer on the side of the nickel layer which is opposite the tape, and with the copper layer having a small gap in it. When a current was passed through one of the conductors, the center of current flow suddenly veered close to the magnetic tape at the location of the gap in the copper layer, the current thereat being close enough to the magnetic tape to magnetize a spot on the tape.

This technique has enabled construction of a recording head by printed circuit methods so that the conductors could be spaced close together, such as at a spacing of three mil (thousandth of an inch) to enable the recording of images of high detail. However, with conductor strips spaced so closely together, it is difficult to make connections to the strips. Where a moderate number of recording elements such as 32 of them are utilized, the conductors can be formed with ends that are tapered to a large width and arranged in a fan formation. However, there are applications where it is desirable to provide a much greater number of recorder elements, as in a device which can serve as a line printer. For example, in one application, it is desirable to provide perhaps 2000 recording locations arranged to extend across most of a sheet of paper of 8½ inches width. The provision of about 2000 elements spaced four mil apart, can lead to great difficulties in providing connections to the elements to send currents through selected elements. The ends of the elements could be enlarged to perhaps one-sixteenth inch and spaced one-eighth inch apart, but this would result in the ends of the 2000 elements occupying a region having a width of 250 inches, which would make the machine very cumbersome.

SUMMARY OF THE INVENTION

In accordance with one embodiment of the present invention, a high density magnetic image recording head is provided, which is compact, which can be constructed at low cost using printed circuit techniques, and which provides for relatively simple energization and connections. The head includes a large number of recorder elements having closely spaced parallel strip portions, with each strip portion having a recording location therealong, and with the recording locations of all of the strip portions arranged substantially along an imaginary recording line. The recording elements are divided into groups, with each group including a common interconnect region on one side of the recording line, where all of the elements of a group are connected together, and with each element of the group having a distinct terminal located on the other side of the recording line. A series of cross-conductors are provided to interconnect elements of different groups at their terminal ends. Thus, each recorder element has one end connected to a common interconnect region, and has an opposite end forming a terminal that is connected to elements of many other groups.

As a result, any particular recorder element can be energized by connecting one end of a source of electricity to the common interconnect region with which that element is associated, and connecting the other end of the source to the cross conductor with which that element is associated.

In one system designed to record up to 2,048 spots closely spaced across approximately an eight inch width of a magnetic tape, some groups of elements are arranged with their terminals on one side of the recording line while other groups of elements are arranged with their terminals on the other side of the recording line. The strip portion of each recorder element is only about two mil wide, but the terminal of each element has a width many times greater than this. The terminal portions are arranged in a staggered pattern, so that the entire arrangement of elements, including the common interconnect regions and the staggered and relatively wide terminals, can be accommodated in a head of moderate size.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a multiple copy printing system which utilizes the recording head of the present invention;

FIG. 4A is a partial block diagram of another recording head similar to that of FIG. 4 but with slight modifications;

DESCRIPTION OF THE PREFERRED EMBODIMENT

Figure 2:
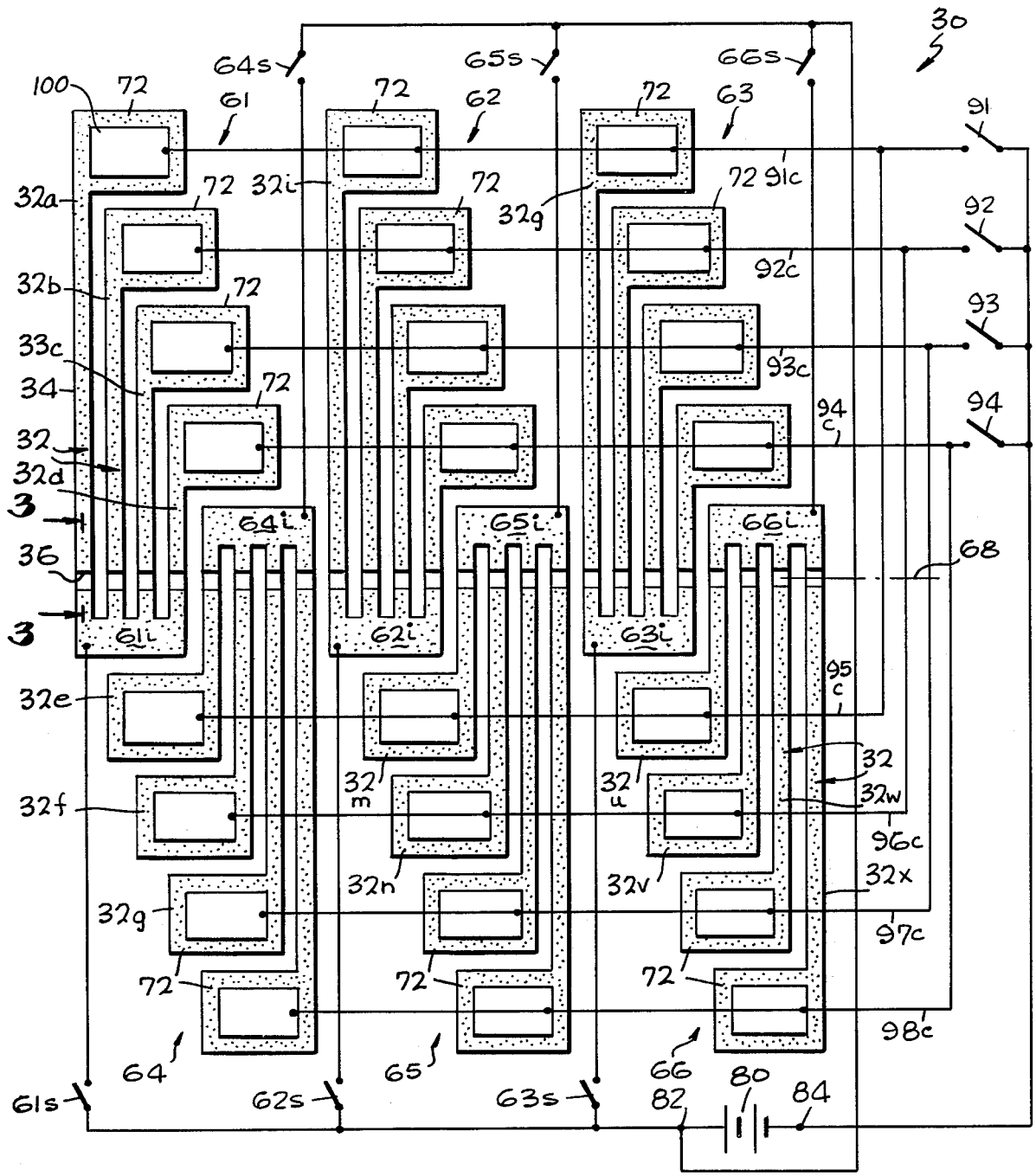
FIG. 2 is an enlarged simplified plan view of a low capacity recording head which can be used in the system of FIG. 1.

FIG. 1 illustrates a printing system 10 which utilizes a recording head 12 of the present invention to form magnetic images across the width of a magnetic tape or band 14, at a recording station 15. After the images are formed, the magnetic tape moves past a transfer station 16 where the magnetic images on the tape are transferred to a magnetic drum 18. The images on the drum are then toned by a toner applicator 20, and the toner is then transferred to a web of paper or other print medium 22 to thereby print images on the paper. This system enables multiple copies of a page to be printed, inasmuch as a transfer device 24 at the transfer station, can press the magnetic tape 14 against the drum 18 during almost one turn of the drum to transfer a magnetic image onto the surface of the drum. The transfer device 24 then allows the tape to move away from the drum 18, so that the drum can rapidly turn while the magnetic image thereon is repeatedly coated with toner and the toner is repeatedly transferred onto the web of paper 22. During the making of multiple copies, additional magnetic images can be recorded on the tape 14 and the tape moves into a storage loop 26. Where only a single copy of data is required, toner can be applied directly to the wide tape 14 immediately after it passes across the recording head 12, and paper can then be moved adjacent to the tape to transfer the toner to the paper or other print medium.

Figure 3:
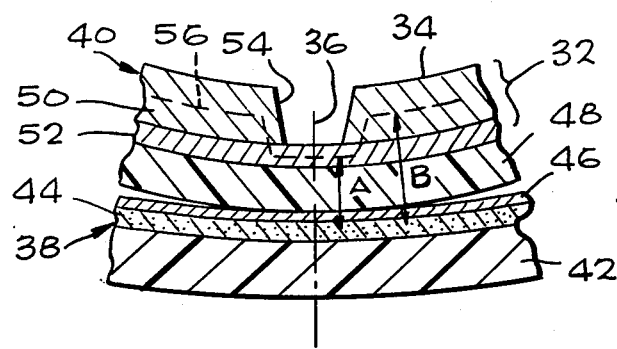
FIG. 3 is an enlarged view taken on the line 3—3 of FIG. 2, and showing the manner in which the recording head is utilized in conjunction with a magnetic record medium.

FIG. 2 illustrates a small array 30 of recorder elements 32 for recording magnetic images on a magnetic tape or other magnetizable medium, which can be used in the recording head 12 of FIG. 1. Each of the elements 32 includes a strip-shaped portion 34 with a recording location 36 therealong. When a magnetic tape is held close to the recorder elements and a current is passed through an element, the location on the tape which lies adjacent to the recording location 36 may have its magnetization changed so that a "spot" is recorded on the magnetic tape. FIG. 3, which is a cross-section of one of the recorder elements 32 in FIG. 2, shows the manner in which a magnetic tape 38 is held against a recording head 40 which includes the array of recorder elements 32. The magnetic tape 38 includes a non-magnetic backing 42, a magnetic layer 44, and a thin nonmagnetic protective film 46 over the magnetic layer. The recording head includes a supporting base sheet 48 of dielectric material which supports the array of recorder elements 32. Each recorder element 32 includes two layers 50, 52 of conductive material, with one layer 50 constructed of highly conductive material such as copper and the other layer 52 constructed to only moderately conductive material such as nickel. The base sheet 48 curves gently toward and away from the record, and is closest at or near the recording location 36. At the recording location 36, there is a gap 54 in the copper layer 50. Thus, when current passes along the strip portion 34 of the element, the center of current flow, or current path 56, will suddenly veer close to the magnetic tape at the recording location 36. The current path 56 is at least a distance B away from the magnetic layer 44 of the tape, at positions up-path and downpath from the recording location; this distance B being great enough that the current cannot magnetize the magnetic layer. However, at the distance A, the current is close enough to magnetize the magnetic layer and record a spot thereon. The layers 50, 52 can be deposited or etched using techniques well known for use in building printed circuits.

In order for the recording head 12 of FIG. 1 to generate magnetic images of good quality, such as rows of stylized characters, a picture, or a graph, it is necessary that the recording head 12 have a large number of recording elements spaced across the width of the tape. In many devices that print images corresponding to electrical signals, such as facsimile receivers, approximately two thousand separate recording points are provided across the width of an 8½ inch web of paper. My earlier application Ser. No. 594,583, filed July 10, 1975, now U.S. Pat. No. 4,025,927 shows a recording head with thirty-two recording elements spaced three mil apart, with each element having a 1.5 mil width at the recording location but tapering to a much greater width at its end to permit connections to ba made to each element. However, when a very large number of recording elements must be positioned at close spacings, the use of tapered widths at the ends of the elements requires too much space and makes connections too complex.

In accordance with the present invention, an array of recorder elements of moderate size is provided which enables connections to be made to a large number of individual elements. Referring again to FIG. 2, it can be seen that the array 30 of recorder elements is arranged in 6 groups 61–66, each group including four recorder elements 32. The recording locations 36 of all recorder elements are arranged along an imaginary recording line 68 extending perpendicular to the strip portions 34 of the elements. The first group of elements 61 includes four elements 32a–32d having a common interconnect region 60i on one side of the recording line 68, and with each element having a separate terminal portion 72 on the other side of the recording line. The second and third groups of elements 62, 63 are similarly arranged, with common interconnect regions 62i, 63i below the recording line 68 and with separate terminals 72 above the line. The last three groups 64–66 of elements are symmetric to the first three groups, in that they have common interconnect regions 64i, 65i, 66i above the recording line 68 and terminals 72 below the line.

Current for operating the recorder element 32 is provided by an electricity source 80 with two terminals or ends 82, 84. One end 82 of the source can be connected by any of six group switches 61s–66s to corresponding interconnect regions 61i–66i of the six groups of recorder elements. The other end 84 of the source can be connected by any one of four cross-conductor switches 91–94 to cross conductors 91c–98c. Each cross conductor such as 91c, is coupled to three terminals 72 of three recorder elements 32a, 32i, 32q that are arranged in a row. Thus, when the two switches 61s and 91 are both closed at the same instant, a current can flow through the element 32a so that its recording location 36 can record a spot on the magnetic tape.

One way of passing a current through each of the recording elements 32a–32x is to first close one of the group switches such as 61s and leave it closed, while each of the column switches 91–94 are closed momentarily in sequence. This results in elements 32a, 32b, 32c, and 32d conducting current in sequence. Next, switch 61s is opened, switch 64s is closed, and the switches 91–94 are again closed momentarily in sequence, to pass currents through elements 32e–32h in sequence. Thus, by closing one of the six group switches 61s–66s at a time, and by closing each of four cross-conductor switches 91–94, currents can be made to go through all of the recorder elements. Of course, in actual recording where not all possible spots along a line are to be magnetized, current should flow through only some of the switches, and this can be accomplished by closing only selected ones of the cross-conductor switches 61s–66s. It also may be noted that each of the recorder elements 32 is provided with a diode 100 to interconnect the cross conductor such as 91c to the strip portion 34 of an element, to allow current flow only in one direction through the element. This is to prevent unwanted current flows. For example, at a time that switches 91 and 61s are closed to energize element 32a, it would otherwise be possible for current to flow unintentionally down element 32i, up element 32j, across part of cross conductor 92c, and down element 32b.

The elements 32 can be formed by printed circuit methods so that their recording locations 36 are spaced a small distance apart such as only a few mils. However, such small widths would make connection of an element to a cross conductor such as 91c difficult, and also such a small width is too small to provide a region for mounting even a small diode 100 if a separate chip-like diode is to be utilized. The layout illustrated in FIG. 2 with staggered terminals 72, enables enlarged terminal areas to be provided without unduly enlarging the size of the entire array. The terminals 72 are formed at the ends of the recorder elements opposite the interconnect regions such as 61i, and all of the terminals of a group such as 61 are arranged in a staggered fashion. The element 32d at one end of the group 61, has a terminal 72 located immediately above the interconnect region 64i of another group. The terminal of a next element 32c of the group 61 is located immediately above and slightly to one side of the terminal of element 32d. This continues until the terminal of element 32a is located furthest out and closest to one side of the group. The terminals of a next adjacent group 64 are correspondingly located, with the terminal of a first element 32e located immediately under the interconnect region 61i of another group, and the terminals of the other elements 32f, 32g, 32h are arranged in a staggered fashion with the terminals progressively further from one end of the group being located progressively further away from the recording line 68. This arrangement of the terminals allows a large number of terminals to be located in a small space and with all of the terminal regions formed primarily by a printed circuit method. Of course, the recording locations do not have to be located along a line 68, although it is often advantageous to do so to avoid the need for delay circuitry.

In an array similar to that of FIG. 2, but with 2048 different elements arranged in 64 groups of 32 elements each, with the elements spaced four mils apart at their recording locations, and with terminals that are fifty mils wide and fifty mils long, the entire array can be contained on an area of only about $8\frac{1}{2}$ inches by 4 inches.

Figure 4:
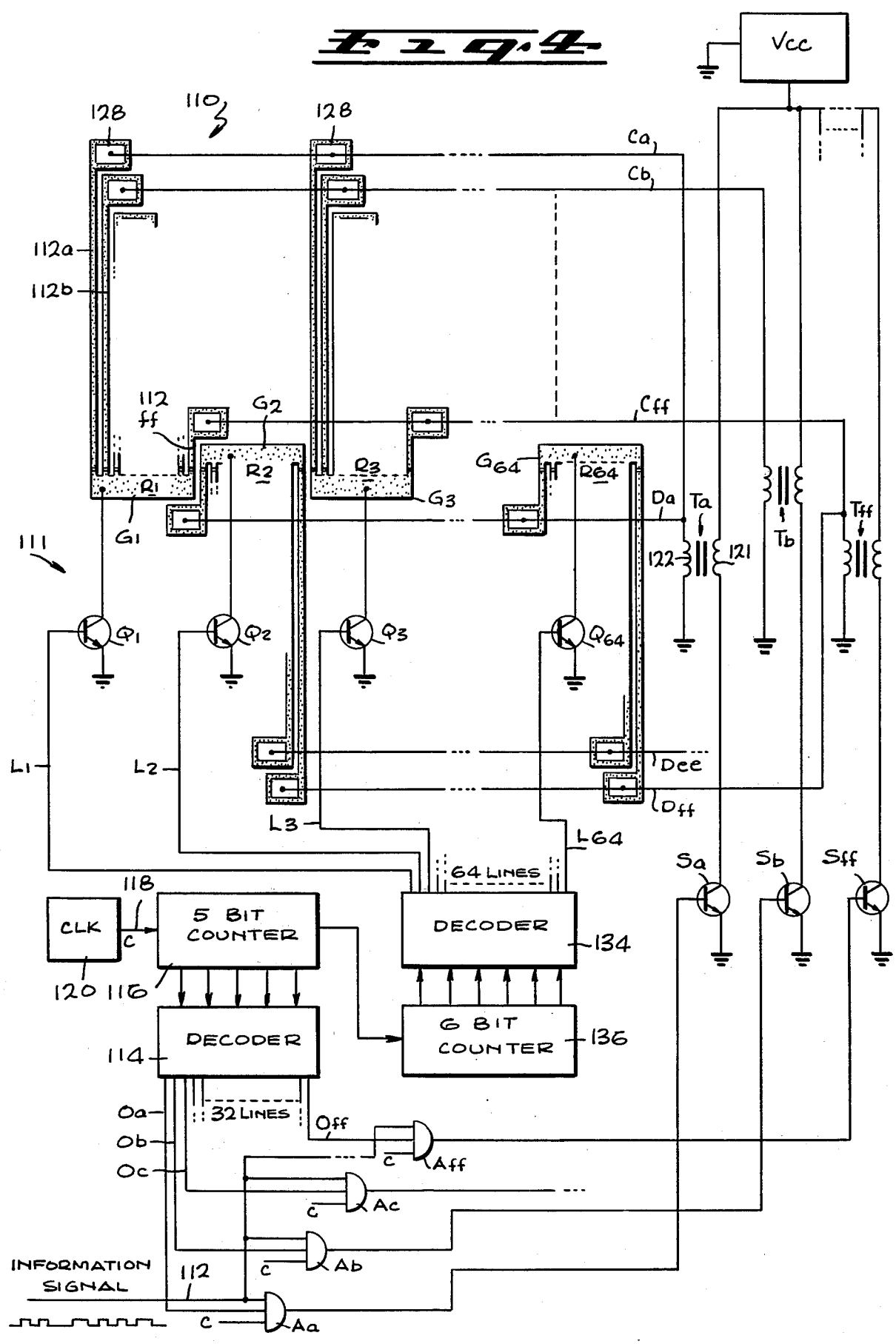
FIG. 4 is a partial block diagram of a recording head similar to that of FIG. 2 but of larger capacity, showing some of the control circuitry thereof.

FIG. 4 illustrates a recording head assembly 110 which includes an array of 2048 elements, and driving circuitry for energizing the elements. The array is formed with sixty-four groups $G_1$-$G_{64}$ of elements, each group such as $G_1$ having thirty-two elements 112, in an array similar to that of FIG. 2 except that there are more elements in each group and more groups. The drive circuit 111 for the recording head assembly 110 includes an information input line 112 which receives information signals representing the darkness of each of 2048 points along a line that is to extend across the width of the paper, with the points spaced 4 mil apart along the line. This information signal is delivered to each of thirty-two AND gates $A_a, A_b \ldots A_z, A_{aa}, A_{bb} \ldots A_{ff}$. The gates $A_a$-$A_{ff}$ are designed to be opened in sequence, which is accomplished by delivering the outputs of a decoder 114 over each of thirty-two lines $O_a$-$O_{ff}$ to the AND gates $A_a$-$A_{ff}$. The decoder 114 is driven by a five bit binary counter 116 whose input 118 is received from a clock 120. The output c of the clock is also delivered to each of the AND gates $A_a$-$A_{ff}$. The five bit counter 116 repeatedly counts up to 32, and at each count delivers a signal to the decoder 114. As a result, the outputs $O_a$-$O_{ff}$ of the decoder receive signals in sequence. Therefore, the gates $A_a$-$A_{ff}$ may be turned on in sequence to turn on corresponding transistor switches $S_a$-$S_{ff}$.

When a switch, such as $S_a$, is turned on, it allows current to flow from a source $V_{cc}$ through the primary winding 121 of a corresponding transformer such as $T_a$. This induces a large current in the secondary winding 122 of the transformer, to create a large current in two corresponding cross-conductors $C_a$ and $D_a$. Current flows through a cross conductor such as $C_a$, through the terminal 128 of a corresponding element 112a, through that element to the common interconnect region $R_1$ of that element, and through a corresponding group switch $Q_1$ to the ground. The group switch $Q_1$ is kept open while pulses are passed through all thirty-two elements $112a$-$112_{ff}$ of group $G_1$. Then switch $G_1$ is turned off and the next group switch $Q_2$ is turned on. This continues until the last group switch $Q_{64}$ is turned on to complete the line of dots recorded on the record.

The group switches $Q_1$-$Q_{64}$ are controlled by the 64 output lines $L_1$-$L_{64}$ of a decoder 134 which is driven from a 6-bit binary counter 136. The input of the counter 136 is connected to an overflow output line 140 of the 5-bit counter 116. In one system, the clock 120 delivers pulses on line 118 at a frequency of one megahertz. As a result, the outputs $O_a$-$O_{ff}$ of the first decoder 114 receive pulses of approximately 1 microsecond duration in sequence during each period of 32 microseconds. The outputs $L_1$-$L_{64}$ of the second decoder 134 receives pulses of 32 microseconds duration in sequence. After a period equal to 32 microseconds per group switch Q times 64 switches ($Q_1$-$Q_{64}$), which equals 2048 microseconds, the broad tape on which the head is recording magnetic images, advanced a small distance such as four mil so that the cycle can begin again and another row containing 2048 possible points of recording will be positioned adjacent the recording locations of the head. As a result, with a one megahertz clock, the tape can move past the head at a speed such as 2 inches per second.

The clock 120 is normally synchronized with the information signal on line 112, which may be the output of a computer, a facsimile receiver circuit, or other device which provides signals representing an image to be recorded.

The voltage supply $V_{cc}$ may supply pulses of about 30 volts and 300 milliamperes. The current through the cross conductors such as $C_a$, are about 5 amperes. Thus, the group switches such as $Q_1$ must be capable of switching repeated large current pulses such as of 5 amperes. Transistor switches which can carry such currents can be obtained at moderate costs only where slow switching is acceptable, such as switching requiring five microseconds. The delay in switching is greatest during switch-off, due to charge storage effects. To permit operation with such slow switching but high current capacity transistors, buffers can be provided as shown in the modified circuit of FIG. 4A.

FIG. 4A illustrates a portion of a circuit 110A similar to that of FIG. 4, but with a clock signal buffer 142 between the clock 120 and the first counter 116, and with an information signal buffer 144 between the information input line 112 and the AND gates $A_a, A_b$, etc. The clock signal buffer 142 delivers thirty-two clock pulses in a row, and then waits a period of eight clock pulses before delivering another series of thirty-two pulses. Thus, for one microsecond clock pulses, the system essentially stops operating after the last recording element in a group, such as 112ff, is operated, for a period of eight microseconds. This allows time for the group switch $Q_1$ to turn off. The information signal buffer 144 stores 32 bits of information, delivers the 32 bits at one microsecond spacings on line 146, and then waits a period H of eight microseconds before beginning to deliver another 32 bits. It may be noted that the two registers in the buffer 144 are clocked alternately, with each register clocked by an input clock signal derived from the original information signal on line 112 while information is read into that register, and being clocked by the buffered clock signal C' while information is read out of that register. Where the input information signal on line 112 is at a frequency of 0.8 megacycles, 32 bits are received by the buffer 144 every 40 microseconds, and the buffer delivers a burst of 32 bits plus an eight microsecond pause every 40 microseconds. In this way, a delay is provided between operations of each group of recorder elements, to permit time for turn off of the group switches $Q_1$-$Q_{64}$. This results in only a moderate decrease in the speed of the recording apparatus.

Figure 5:
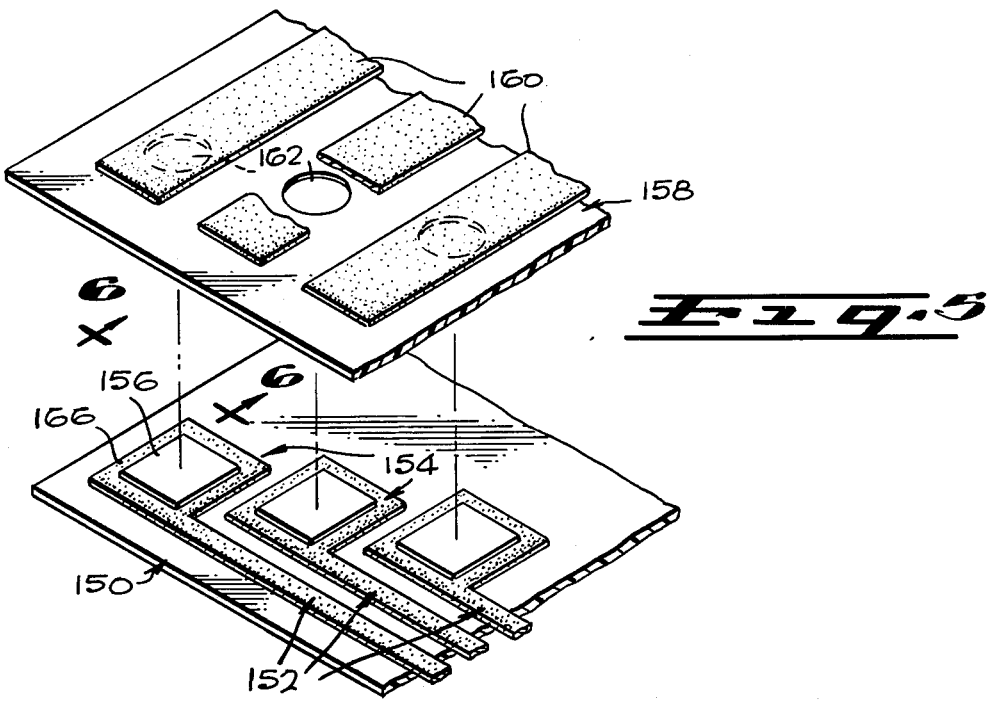
FIG. 5 is an exploded partial perspective view of the recording head of FIG. 4, showing the manner in which it is constructed.
Figure 6:
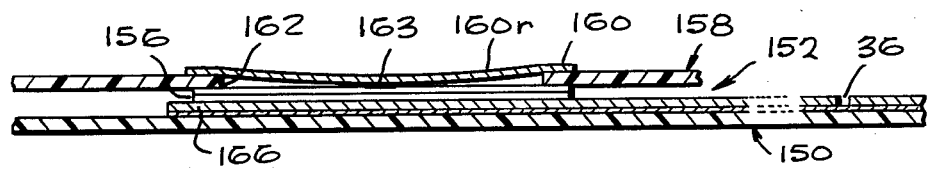
FIG. 6 is a view taken on the line 6—6 of FIG. 5, and showing the recording head after assembly.

FIGS. 5 and 6 illustrate some of the details of construction of the recording head, which can be constructed with basically printed circuit techniques. The head includes a base 150 with recorder elements 152 thereon, each recorder element having a pair of layers except at the recording location, as described above, and with the terminal area 154 of each element being enlarged and including a pad region 166 and a diode 156. A sheet 158 of insulative material which carries interconnect cross conductors 160, is applied over the base 150. The sheet 158 has a staggered array of holes 162 which are designed to lie over the diodes 156 of the recorder elements and to be connected thereto. As shown in FIG. 6, the region 160r of each cross conductor which lies over a hole 162, can be depressed into the hole and welded at 163 to the diode 156 which lies on the terminal pad region 166 of a recorder element.

Figure 7:
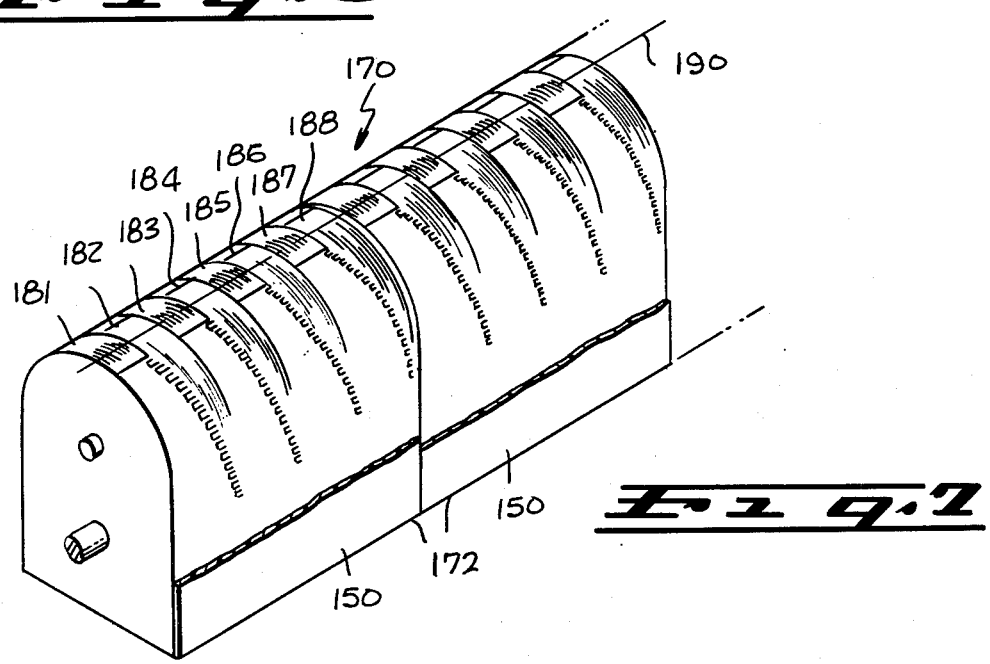
FIG. 7 is a perspective view of a recording head in its final form.

FIG. 7 illustrates a recording head 170 which utilizes a row of eight modules 172. Each module 172 includes two hundred fifty-six elements 152 arranged in eight groups 181-188 of thirty-two elements each. The array is bent so that a recording line 190 which passes through the recording locations of all elements, can be pressed adjacent to a magnetic tape or the like. It may be noted that in the figure the array would be covered by a thin base 150 of insulative material, such as a one mil thick sheet of Kapton.

Thus, the invention provides a recording head for use where a large number of closely spaced recording locations must be provided, wherein the head occupies a relatively small space and can be driven with relatively simple circuitry. This is accomplished by an array of recorder elements with parallel strip portions that have recording locations therealong. The elements are divided into groups, one end of all elements in a group being connected together and the other ends of the elements having terminals. Cross conductors are provided which interconnect an element in each group with an element of a plurality of other groups, so that each element can be individually driven by closing a switch that leads to the group of which that element is a member, and by closing another switch which leads to the cross conductor to which that element is connected. The terminal ends of the elements have enlarged pad regions arranged in a staggered fashion with the terminal regions of elements closer to one end of the group lying progressively closer to the recording line. Also, alternate groups of elements are arranged in symmetrical fashion so that the interconnect regions of alternate groups lie on alternate sides of the recording line.

Although particular embodiments of the invention have been described and illustrated herein, it is recognized that modifications and variations may readily occur to those skilled in the art and consequently it is intended that the claims be interpreted to cover such modifications and equivalents.

I claim:

1. A recording apparatus comprising:
   a plurality of recorder elements having substantially parallel strip portions, each strip portion having a recording location therealong, said recording locations arranged a selected distance from each other substantially along an imaginary recording line which extends substantially perpendicular to said strip portions, a plurality of said recorder elements arranged in a group and a plurality of groups spaced along said recording line with the elements in each group having a common interconnect region on a first side of said recording line and with each element of the group having a separate terminal on a second side of said recording line;
   a plurality of cross conductors, each coupled to a selected terminal within each group of elements;
   a plurality of common region switch means, each coupled to a different one of said common interconnect regions; and
   a plurality of cross conductor switch means, each coupled to a different one of said cross conductors;
   the common region switch means and the cross conductor switch means being disposed such that a source of electricity may be connected between said common region switch means and said cross conductor switch means to apply a current through one of said recorder elements when the particular common region switch means and cross conductor switch means which are both coupled to that recorder element are simultaneously in a closed state.

2. The apparatus described in claim 1 wherein:
   each of said recorder elements includes a diode at the terminal of the element which connects a corresponding cross conductor to the rest of the element.

3. The apparatus described in claim 1 including:
   a second plurality of groups of recorder elements, having common interconnect regions interspersed with the interconnect regions of said first named groups, the common interconnect regions of said second groups lying on the second side of said recording line and each element of a second group having a terminal on said first side of said recording line.

4. The apparatus described in claim 1 wherein said apparatus includes a means for closing said switch means comprising:
   an information signal source for delivering an information signal;
   a first counter having an overflow output which delivers a new signal each time a count is reached which substantially equals the number of groups of recorder elements;
   means responsive to the count in said first counter and said information signal for closing certain of the switch means of a first of said plurality of switch means in a predetermined sequence;

a second counter having an input connected to said overflow output of said first counter; and means responsive to the count in said second counter for closing each of the switch means of a second of said plurality of switch means in a predetermined sequence.

5. The recording apparatus described in claim 1 wherein:

the terminal of each element is a plurality of times wider than the strip portion of the element; and the terminals of each group of recording elements are arranged in a staggered manner with a first element having a first terminal extending to a predetermined side of the strip portion thereof, a second element whose strip portion is adjacent to the strip portion of said first element having a second terminal extending to said predetermined side of the strip portion thereof and lying slightly further from said recording line than said first terminal, and a third element whose strip portion is adjacent to the strip portion of said second element having a third terminal extending to said predetermined side of the strip portion thereof and lying slightly further from said recording line than said second terminal.

6. In a recording apparatus that includes a group of closely spaced recorder elements, each recorder element including a conductive strip portion with a recording location positioned therealong and with said recording locations closely spaced substantially along an imaginary recording line, said elements including a common interconnect region on a first side of said recording line where said elements are connected together, the improvement comprising:

a multiplicity of recording element terminals, each formed at an end of an element which lies on a second side of the recording line opposite the common interconnect region of said elements, each terminal of an element being a plurality of times wider than the strip portion of the element;

said terminals being arranged in a nested manner, with a first element having the terminal thereof extending to a predetermined side of the strip portion thereof, and a second element whose strip portion is adjacent to the strip portion of said first element having a second terminal extending to said predetermined side of the strip portion thereof and lying farther from said recording line than said first terminal, with the strip portions of all subsequent elements more closely spaced than the width of the terminals thereof, and the strips each longer than the next prior strip to position its terminal in nested position.

7. The improvement described in claim 6 wherein:

said recording apparatus includes a second group of closely spaced recorder elements, each having a conductive strip portion with a recording location positioned substantially along said recording line, said second group having a common interconnect region on said second side of said recording line and the elements of said second group each having a terminal on said first side of said recording line;

the terminals of said second group of elements being arranged in the same staggered relationship to one another as the terminals of said first group of elements.

8. In a recording apparatus that includes a plurality of groups of closely spaced recorder elements, each group having a common interconnect region where the elements of that group are interconnected and each element having a separate terminal and a recording location between said common region and its terminal, for recording on a small area of a record medium in response to an information signal, the improvement comprising:

electricity supply means having a pair of terminals;

a plurality of group switches, each connecting a terminal of said electricity means to a different one of said common interconnect regions;

a second plurality of switches, each connecting another terminal of said electricity means to a terminal of each of a plurality of recorder elements that lie in different ones of said groups;

buffer means for receiving said information signal said buffer means including an outlet carrying an outlet signal containing the information of said information signal in bursts of predetermined length with each burst being followed by a quiescent period during which no information is delivered on said outlet;

means responsive to the outlet signal on said buffer means for successively closing said second plurality of switches; and means for keeping each of said plurality of group switches closed for the duration of a burst of information signals on said buffer outlet, and for turning off the switch during said quiescent period, whereby to enable the use of group switches of long turn-off times.

9. Apparatus for recording closely-spaced magnetic spots on a magnetizeable record, comprising:

a base sheet of dielectric material having a first surface close to the record and a second surface away from the record;

a plurality of recorder elements mounted on said second surface, said elements having closely spaced substantially parallel conductive strip portions, each strip portion having a partially cutaway region forming a recording location and having a center of conduction which curves toward said record at said recording location where said center of conduction is diverted close to said record; and means for passing through said recorder elements currents of magnitudes which magnetize said record at the recording location only, magnetizing occurring only when said currents are at a distance from said record substantially no greater than the distance of said center of conduction from said record at said recording location.

10. The apparatus described in claim 9 wherein:

said recorder elements are arranged in a plurality of groups, with each group having a common interconnect region where one end of the recorder elements are interconnected, and each recorder element of a group having a separate terminal, said groups being closely spaced across the width of said record; and said means for passing currents includes electricity means for supplying current, a first plurality of group switch means for connecting said electricity means to said common interconnect regions, and a second plurality of switch means for connecting said electricity means to said terminals of said recorder elements.

* * * * *